(12) United States Patent
Jones et al.

(10) Patent No.: US 8,636,833 B2
(45) Date of Patent: Jan. 28, 2014

(54) AIR FILTRATION MEDIUM WITH IMPROVED DUST LOADING CAPACITY AND IMPROVED RESISTANCE TO HIGH HUMIDITY ENVIRONMENT

(75) Inventors: David Charles Jones, Midlothian, VA (US); Hyun Sung Lim, Midlothian, VA (US); Cheng-Hang Chi, Midlothian, VA (US); Lu Zhang, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 236 days.

(21) Appl. No.: 12/878,084

(22) Filed: Sep. 9, 2010

(65) Prior Publication Data

US 2011/0214570 A1    Sep. 8, 2011

Related U.S. Application Data

(60) Provisional application No. 61/242,879, filed on Sep. 16, 2009.

(51) Int. Cl.
  *B01D 46/00* (2006.01)

(52) U.S. Cl.
  USPC .................. 95/287; 55/486; 55/524

(58) Field of Classification Search
  USPC .......................... 95/268, 273–287
  See application file for complete search history.

(56) References Cited

U.S. PATENT DOCUMENTS

| | | |
|---|---|---|
| 338,992 A | 3/1886 | Loomis |
| 3,341,394 A | 9/1967 | Kinney |
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,127,706 A | 11/1978 | Martin et al. |
| 4,340,563 A | 7/1982 | Appel et al. |
| 4,374,888 A | 4/1983 | Bornslaeger |
| 4,536,361 A | 8/1985 | Torobin |
| 5,591,278 A | 1/1997 | Marco |
| 6,183,670 B1 | 2/2001 | Torobin et al. |

(Continued)

FOREIGN PATENT DOCUMENTS

| | | |
|---|---|---|
| EP | 1366791 | 12/2003 |
| WO | WO 03/080905 | 10/2003 |

OTHER PUBLICATIONS

Diversified Enterprises, Critical Surface Tension, Surface Free Energy, Contact Angles with Water, and Hansen Solubility Parameters for Various Polymers, found on the internet at: http://www.qualitylogoproducts.com/blog/polypropylene-polyesternylon-guide-to-materials/.

(Continued)

*Primary Examiner* — Duane Smith
*Assistant Examiner* — Sonji Turner
(74) *Attorney, Agent, or Firm* — Simon L. Xu

(57) ABSTRACT

A method for filtering particles from water mist laden air involves passing the air through a medium that has a nanoweb layer in fluid contact with a hydrophobic nonwoven web. The hydrophobic web can be made of an intrinsically hydrophobic material, or can be coated with a hydrophobic coating. The medium does not undergo the large pressure drops normally associated with filtration of water mists and retains its efficiency well.

15 Claims, 1 Drawing Sheet

(56) References Cited

U.S. PATENT DOCUMENTS

| | | | |
|---|---|---|---|
| 6,315,806 B1 | 11/2001 | Torobin et al. | |
| 6,382,526 B1 | 5/2002 | Reneker et al. | |
| 6,491,776 B2 | 12/2002 | Alper et al. | |
| 6,520,425 B1 | 2/2003 | Reneker | |
| 6,695,992 B2 | 2/2004 | Reneker | |
| 6,746,517 B2* | 6/2004 | Benson et al. | 95/273 |
| 6,808,553 B2* | 10/2004 | Kawano et al. | 95/287 |
| 7,235,122 B2* | 6/2007 | Bryner et al. | 95/287 |
| 2002/0046656 A1* | 4/2002 | Benson et al. | 95/287 |
| 2002/0092423 A1* | 7/2002 | Gillingham et al. | 95/287 |
| 2006/0084340 A1 | 4/2006 | Bond et al. | |
| 2006/0096260 A1* | 5/2006 | Bryner et al. | 55/486 |
| 2007/0074628 A1* | 4/2007 | Jones et al. | 95/273 |
| 2008/0070463 A1* | 3/2008 | Arora et al. | 442/327 |
| 2008/0134652 A1* | 6/2008 | Lim et al. | 55/486 |
| 2008/0160856 A1* | 7/2008 | Chen et al. | 442/341 |
| 2008/0217241 A1* | 9/2008 | Smithies et al. | 210/505 |
| 2008/0242171 A1* | 10/2008 | Huang et al. | 442/51 |
| 2008/0264259 A1 | 10/2008 | Leung | |
| 2008/0274658 A1* | 11/2008 | Simmonds et al. | 442/334 |
| 2008/0302242 A1* | 12/2008 | Schelling et al. | 95/273 |
| 2008/0314010 A1* | 12/2008 | Smithies et al. | 55/498 |
| 2008/0315464 A1* | 12/2008 | Smithies et al. | 264/454 |
| 2009/0249956 A1* | 10/2009 | Chi et al. | 95/284 |

OTHER PUBLICATIONS

PCT International Search Report and Written Opinion for International Application No. PCT/US2010/048362.

* cited by examiner

AIR FILTRATION MEDIUM WITH IMPROVED DUST LOADING CAPACITY AND IMPROVED RESISTANCE TO HIGH HUMIDITY ENVIRONMENT

FIELD OF THE INVENTION

The present invention relates to air filtration media, for filtering particulate material from gas streams and in particular mist laden gas streams.

BACKGROUND OF THE INVENTION

Gas phase filtration has traditionally been accomplished by low, medium and high efficiency pleatable composite filter media which include either a low, medium or high efficiency fibrous filtration layer of randomly oriented fibers; and one or more permeable stiffening layers which enable the composite filter media to be pleated and to sustain its shape. Such filtration devices serve as vehicle passenger compartment air filters, high performance engine air filters and engine oil filters. ASHRAE (American Society of Heating Refrigeration and Air Conditioning Engineers) pleatable filters and the like typically use a pleated high efficiency filtration media for the filtration element.

Pleatable composite filtration media made of a nanofiber high efficiency layer and a more permeable spunbound fiber stiffening layer (also referred to as an "SN" media) have been shown to give good flux/barrier properties (i.e. high efficiency and low pressure drop). However, the dust-loading capacity is lower than the desired value in certain industrial HVAC applications when filters are challenged with very small dust particles, which can occur when the HVAC system is designed and constructed to have lower efficiency pre-filters in front of the high-efficiency final filters. In the SN structure, the scrim is typically made of nonwoven webs of fiber diameter of 14 to 30 microns which can pre-filter out particles larger than about 5 microns in size. The remaining particles will reach the thin nanofiber layer and quickly fill up the pores and plug up the filters. As the result, filter resistance increases rapidly and thus shortens filter life. Attempts have been made to increase the dust-loading capacity by increasing the basis weight and thickness of the scrim layer but the results are still unsatisfactory for the more demanding situations.

To further complicate the problem, when the humidity of the incoming air is high or the incoming air contains a water mist, dust loaded on the nanofiber layer of the filter media can pick up moisture and swell. It is widely known that a high percentage of atmospheric aerosol is hydroscopic in nature. This further reduces the remaining pore size and creates additional flow restriction and increased pressure drop across the filters. These spikes in pressure drop can create significant problems to HVAC systems.

There remains a need to provide a relatively low cost, high efficiency filter media for these filtration applications which exhibit relatively high dirt-holding and/or air contaminant capacities and relatively low pressure drops in the presence of moisture. One object of the present invention is to provide such a filter medium and a method for use of the same.

SUMMARY OF THE INVENTION

Figure 1:
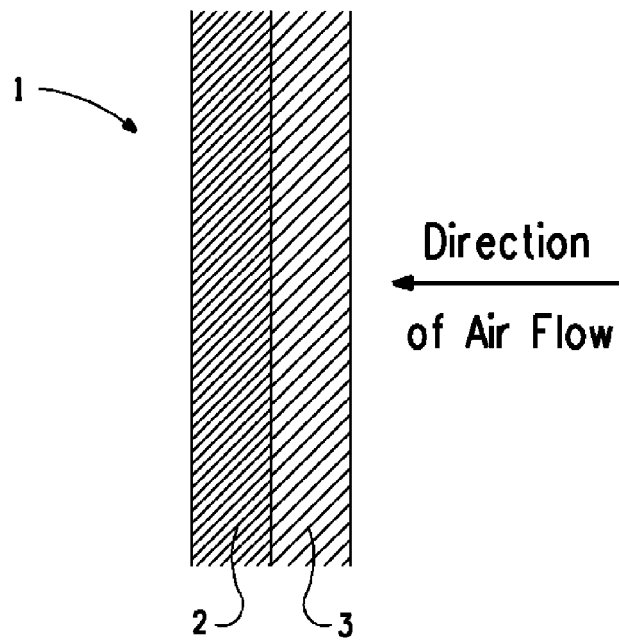
FIG. 1 is a cross sectional representational view of an embodiment of a filter medium useful in the methods of the present invention showing the positions of the components of the medium relative to air flow.

A method for the filtration of particulate matter from flowing air is provided, said method comprising the steps of providing a flow of air laden with a water mist and containing particles that are to be filtered and passing the air flow through a filtration medium. The medium has an upstream side and a downstream side relative to the flow of air and comprises a nanoweb layer downstream of and in fluid contact with a hydrophobic nonwoven web.

DETAILED DESCRIPTION OF THE INVENTION

Definitions

The term "nonwoven" as used herein means a web comprising of a multitude of fibers. The fibers can be bonded to each other or can be unbonded. The fibers can comprise a single material or can comprise a multitude of materials, either as a combination of different fibers or as a combination of similar fibers each comprised of different materials. Similar fibers that are each composed of a plurality of materials can be "bicomponent" (with two materials) or multicomponent.

As used herein "nonwoven fibrous web" or just "nonwoven web" is used in its generic sense to define a generally planar structure that is relatively flat, flexible and porous, and is composed of staple fibers or continuous filaments. For a detailed description of nonwovens, see "Nonwoven Fabric Primer and Reference Sampler" by E. A. Vaughn, ASSOCIATION OF THE NONWOVEN FABRICS INDUSTRY, 3d Edition (1992). The nonwovens may be carded, spun bonded, wet laid, air laid and melt blown as such products are well known in the trade.

"Nonwoven" as used herein further refers to a web having a structure of individual fibers or threads that are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

"Meltblown fibers" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 0.6 denier, and are generally self-bonding when deposited onto a collecting surface. A "meltblown web" is a nonwoven web that comprises meltblown fibers.

"Spunbonded fibers" refers to fibers formed by extruding molten thermoplastic material as filaments from a plurality of fine capillaries of a spinneret having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein in its entirety by reference. Spunbond fibers are generally continuous and often have average deniers larger than about 0.3, more particularly, between about 0.6 and 10. A "spunbond web" is a web that comprises spunbond fibers.

The term "SMN" refers to a multilayer structure comprising a spunbond web plus a meltblown web plus a nanoweb in that order.

The term "MSN" refers to a meltblown web plus a spunbond web plus a nanoweb in that order.

The term "hydrophobic" is used in its conventional sense of "repelling water." A "hydrophobic nonwoven web" is a web that comprises fibers with a hydrophobic surface. The surface may be hydrophobic by virtue of the material of the fiber, for example the fiber may be constructed entirely of a polyolefin, as polyolefins would be considered to be intrinsically hydrophobic. The fiber may also be spun from a hydrophilic material such as polyamide or polyester, and have a hydrophobic coating. For example the fiber may be spun from polyamide or polyester, and have a coating thereon of a surfactant, and in particular a fluorosurfactant. By a material that is capable of "repelling water" is therefore meant a hydrophobic material that resists wetting by aqueous media, an agent comprising fluorine and carbon atoms being preferred. For example the hydrophilic material can be at least partially coated with a fluorinated material. Alternatively the fluorinated material is selected from the group consisting of Zonyl® D fabric fluoridizer consisting of fluorinated methacrylate copolymers or Zonyl® 8300 fabric protector consisting of fluorinated acrylate copolymers. The treatment of fabrics with such fluorinated polymers and oligomers is common in the trade and is not limited to these chemicals. One skilled in the art will be able to choose a suitable treatment.

The water-repellent coating employed in the invention can therefore be any agent that repels water and that can be applied to the hydrophilic web, an agent comprising fluorine and carbon atoms being preferred. A preferred water-repellent coating of the invention is one comprising a fluoropolymer, and especially a mixture of fluoroacrylate polymers, e.g., OLEOPHOBOL SM® from Ciba Spezialitätenchemie Pfersee GmbH, Langweid, Germany. The coating may be applied to the fiber in a variety of ways. One method is to apply the neat resin of the coating material to the stretched high modulus fibers either as a liquid, a sticky solid or particles in suspension or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, aromatic solvents or hydrocarbon solvents, with illustrative specific solvents including paraffin oil, xylene, toluene and octane. The techniques used to dissolve or disperse the coating polymers in the solvents will be those conventionally used for the coating of similar elastomeric materials on a variety of substrates.

For application of the water-repellent agent to a hydrophilic fiber, any method is suitable in principle that allows the water-repellant agent in the chosen formulation to be uniformly distributed on the surface of the fiber. For example, the water-repellent agent formulation can be applied as a thin film on a roller and the hydrophilic fiber passed through the film. Alternatively, the water-repellent agent formulation can be sprayed on to the hydrophilic fiber. The water-repellent agent formulation can also be applied to the fiber using a pump and a pin, slit or block applicator.

The application of coating can be effected by passing the hydrophilic web over a roller immersed in a bath containing the aqueous emulsion of the water-repellent agent.

The drying of the coated web is performed within suitable ranges of temperature. The parameter ranges for temperature and drying time are also determined by the requirements of the selected application method. If the water-repellent agent is applied on the web in the web spinning process, for example, after the fiber has left the wash bath, the ranges of temperature and drying time will be determined by the spinning speed and the structural features of the spinning facility.

The fibers may further be a bicomponent structures in which the outer surface is spun from a hydrophobic material such as a polyolefin.

Examples of polymers that would be considered hydrophobic are polymers that comprise only carbon and hydrogen, or carbon, hydrogen and fluorine, for example polyolefins, fluoropolymers and polyvinylidene fluoride. Examples of polymers that would be considered non hydrophobic are polyamides and polyesters.

A meltblown or a spunbond nonwoven fibrous web that is useful in embodiments of the invention may comprise fibers of polyethylene, polypropylene, elastomers, polyesters, rayon, cellulose, polyamide, and blends of such fibers. A number of definitions have been proposed for nonwoven fibrous webs. The fibers usually include staple fibers or continuous filaments.

The term "nanofibers" as used herein refers to fibers having a number average diameter less than about 1000 nm, even less than about 800 nm, even between about 50 nm and 500 nm, and even between about 100 and 400 nm. In the case of non-round cross-sectional nanofibers, the term "diameter" as used herein refers to the greatest cross-sectional dimension.

A "scrim" is a support layer and can be any structure with which the filter medium can be bonded, adhered or laminated. Advantageously, the scrim layers useful in the present invention are spunbond nonwoven layers, but can be made from carded webs of nonwoven fibers, melt blown nonwoven layers, woven fabrics, nets, and the like. Scrim layers useful for some filter applications require sufficient stiffness to hold pleat shape. A scrim as used in the present invention should have an open enough structure to not interfere with the dust holding structure of the medium.

By two or more webs being "in a face to face relationship" is meant that the surface of any one web is located essentially parallel to the surface of one or more other webs and in such a way that the web surfaces at least partially overlap. The webs need not be bonded to each other, but they may be partially or totally bonded to each other over at least a portion of the surfaces or edges.

Two or more webs are in "fluid contact" with each other when during normal end use, all of the fluid that impinges on one of them is expected to impinge on the second web. Not all of the surface area of the two or more webs need be in physical contact with fluid, but all of the fluid is expected to pass through both webs.

By "water mist" herein is meant a two phase gas liquid system comprising a very fine water droplet dispersed in air or gas stream. The mist can be created by the gas or air and water being discharged through water nozzles that create very fine droplets such that the droplets are small enough to be transported by the air or gas stream without undergoing coalescence into a continuous phase during transportation in the air stream. Droplets are typically of the order of 18 to 50 microns in diameter.

The terms "nanofiber web" and "nanoweb" as used herein are synonymous and refer to nonwoven webs that comprise nanowebs and may consist entirely of nanofibers.

DESCRIPTION

The present invention is directed to a method for the filtration of particulate matter from flowing air that avoids substantial increase in operating pressure during periods when air is saturated with water and a mist is formed.

The method comprises the steps of providing a flow of air laden with a water mist and also containing particles that are to be filtered, and passing the air flow through a filtration medium. An example of this situation would be a rainy or misty day. Referring to FIG. 1, the filtration medium (1) in an embodiment has an upstream side and a downstream side relative to the flow of air and comprises a nanoweb layer (2) downstream of and in fluid contact with a hydrophobic nonwoven web (3). The hydrophobic nonwoven web (3) may be of any nonwoven construction known to one skilled in the art, and in particular may be a meltblown web or a spunbond web. In a preferred embodiment of the invention the primary purpose of the nanoweb (2) is for particle filtration. In this embodiment, the function of the nanoweb (2) is not to coalesce the water mist, and the nanoweb (2) remains at least partially dry after the medium (1) has been exposed to mist laden air for 30 minutes.

In a further embodiment of the method, the pressure drop across the medium under exposure to a water mist in an air stream rises by a factor of no more than 10 after exposure to the water mist for 3 minutes.

Figure 2:
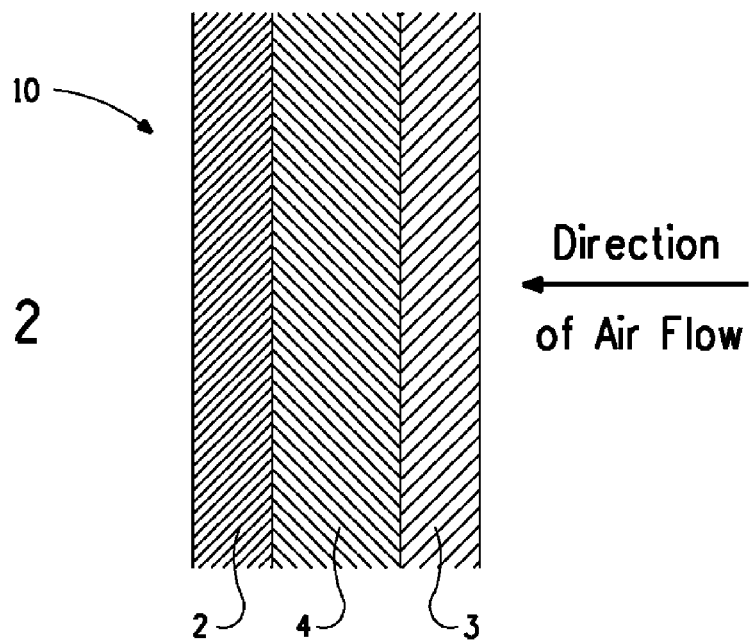
FIG. 2 is a cross sectional representational view of a further embodiment of a filter medium useful in the methods of the present invention.

The hydrophobic web can be in actual contact with the nanoweb as shown in FIG. 1, or referring to FIG. 2 in another embodiment of a filter medium (10) useful in the present invention, a second web (4) that is either hydrophobic or hydrophilic can be situated between the hydrophobic web (3) and the nanoweb (2). The hydrophobic web (3) or the second web (4), if in contact with the nanoweb (2), can be bonded over at least a portion of its surface with the nanoweb (2). The hydrophobic web (3) or the second web (4) can further be point bonded to the nanoweb (2), meaning that the bonding between the nanoweb (2) and the hydrophobic web (3) or second web (4) can be in discrete points over the plane of the webs.

The experimental conditions under which the filtration properties of the filter media are measured are best understood from the examples. However, unless otherwise specified herein, the filtration data are taken from a test in which a flat-sheet media with a circular opening of 11.3 cm diameter is subjected to a 0.5-hour, continuous loading of a sodium chloride aerosol with a mass mean diameter of 0.26 micron, an air flow rate of 40 liter/min corresponding to a face velocity of 6.67 cm/s, and an aerosol concentration of 16 mg/m$^3$. Filtration efficiency and initial pressure drop are measured at the beginning of the test and the final pressure drop is measured at the end of the test. Pressure drop increase is calculated by subtracting the initial pressure drop from the final pressure drop.

The filter medium employed in the method of the invention therefore comprises at least two nonwoven layers, one of which is a nanofiber web and a second upstream hydrophobic nonwoven layer in fluid contact with the nanofiber web. In one embodiment of the invention, the ratio of the mean flow pore size of the hydrophobic web layer to that of the nanofiber web is between about 1 to about 10, preferably between about 1 to about 8, and more preferably between about 1 and about 6.

The hydrophobic web, whether meltblown, spunbond, or any other web, and the nanoweb of the present invention are in fluid contact with each other and may also be in physical contact with each other. They may also be bonded to each other by some kind of bonding means. "Bonding means" in the context of this invention refers to the manner in which lamination of two webs into a composite structure is accomplished. Methods that are suitable in the context of this invention are exemplified by, but not limited to, ultrasonic bonding, point bonding, vacuum lamination, and adhesive lamination. Those skilled in the art are familiar with the various types of bonding, and are capable of adapting any suitable bonding means for use in the invention.

Ultrasonic bonding typically entails a process performed, for example, by passing a material between a sonic horn and an anvil roll such as illustrated in U.S. Pat. Nos. 4,374,888 and 5,591,278, hereby incorporated herein in their entirety by reference. In an exemplary method of ultrasonic bonding, the various layers that are to be attached together are simultaneously fed to the bonding nip of an ultrasonic unit. A variety of these units are available commercially. In general, these units produce high frequency vibration energy that melt thermoplastic components at the bond sites within the layers and join them together. Therefore, the amount of induced energy, speed by which the combined components pass through the nip, gap at the nip, as well as the number of bond sites determine the extent of adhesion between the various layers. Very high frequencies are obtainable, and frequencies in excess of 18,000 Hz are usually referred to as ultrasonic, depending on the desired adhesion between various layers and the choice of material, frequencies as low as 5,000 Hz or even lower may produce an acceptable product.

Point bonding typically refers to bonding one or more materials together at a plurality of discrete points. For example, thermal point bonding generally involves passing one or more layers to be bonded between heated rolls, for example, an engraved pattern roll and a smooth calender roll. The engraved roll is patterned in some way so that the entire fabric is not bonded over its entire surface, and the calender roll is usually smooth. As a result, various patterns for engraved rolls have been developed for functional as well as aesthetic reasons.

Adhesive lamination usually refers to any process that uses one or more adhesives that are applied to a web to achieve a bond between two webs. The adhesive can be applied to the web by means such as coating with a roll, spraying, or application via fibers. Examples of suitable adhesives are given in U.S. Pat. No. 6,491,776, the disclosure of which is incorporated herein by reference in its entirety.

In further embodiments, the ratio of the mean flow pore sizes of the hydrophobic layer to the nanoweb layer are preferably related to the desired overall efficiency of the media at a given particle size, which can be controlled by the pore size of the nanoweb. For example, in further embodiments of the media the ratio of the mean flow pore size of the hydrophobic web layer to that of the nanofiber web is between about 1 to about 3 when the total media has an efficiency of greater than about 60%. The ratio of the mean flow pore size of the hydrophobic web layer to that of the nanofiber web is between about 2 to about 4 when the media has an efficiency of greater than about 70%. The ratio of the mean flow pore size of the hydrophobic web layer to that of the nanofiber web is between about 4 to about 6 when the media has an efficiency of greater than about 80%.

The medium employed in the method of the invention may also be defined by the pore size of the hydrophobic web layer. For example, in one embodiment, the filter media may comprise a nanofiber web with a number average fiber diameter of less than one micron and an upstream meltblown web layer in a face to face relationship with the nanofiber web where the mean flow pore size of the meltblown web layer is between about 12 to about 40 microns, preferably between about 15 to about 25 microns and more preferably between about 18 to about 22 microns.

The medium employed in the method of the invention may also comprise a nanofiber web with a number average fiber diameter of less than one micron and an upstream meltblown web layer in a face to face relationship with the nanofiber web where the ratio of the mean flow pore size of the meltblown web layer to a given particle size is between about 50 and about 154 when the media has an efficiency of between 50% and 99.97% when impinged upon by particles of the given particle size. In a further embodiment the ratio of the mean flow pore size of the meltblown web layer to a given particle size is between about 57 and about 96 when the media has an efficiency of between 50% and 99.97% when impinged upon by particles of the given particle size.

In a still further embodiment, the ratio of the mean flow pore size of the meltblown web layer to a particle size is between about 69 and about 85 when the media has an efficiency of between 50% and 99.97% when impinged upon by particles of the given particle size.

In any of the embodiments mentioned above or in the claims appended here, the medium employed in the method of the invention may also demonstrate low efficiency changes upon being exposed to particles in an air stream. For example, the filter media may exhibit an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

The medium employed in the method of the invention in any of its embodiments may also exhibit low pressure drops when exposed to particles in an air stream. For example, the filter media may exhibit pressure drop increase of less than 200 Pa when filtering particles of size 0.26 microns over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

In one embodiment of the invention the basis weight of the hydrophobic web layer may be greater than about 10 gsm, preferably 15 gsm and more preferably 20 gsm or 30 gsm.

The efficiency of the hydrophobic layer may be greater than about 50%, preferably greater than about 55% and more preferably greater than about 60%. The hydrophobic layer may comprise a melt blown polymeric web.

The nanofiber web may comprise a nonwoven web made by a process selected from the group consisting of electroblowing, electrospinning, centrifugal spinning and melt blowing. The nanoweb may have a basis weight of greater than about 2 grams per square meter (gsm), and preferably greater than about 3 gsm, and more preferably greater than about 5 gsm. The media may further comprise a scrim support layer in contact with either the nanofiber web or the upstream layer.

The medium employed in the method of the invention also may have resistance to the permeability decrease that may occur when a media is loaded with dust and exposed to moisture in the form of humidity. For example, when loaded sodium chloride aerosol with a mass mean diameter of 0.26 micron to a final resistance of between 150 and 300 Pa, the present media may exhibit a permeability loss of less than about 25% when exposed for 8 hours and air with a relative humidity of 98% at 25° C.

The invention is further directed to a method of filtering gas, including air, comprising the step of passing the air through a media fitting any of the disclosed descriptions above.

The as-spun nanoweb may comprise primarily or exclusively nanofibers, advantageously produced by electrospinning, such as classical electrospinning or electroblowing, and in certain circumstances, by meltblowing or other such suitable processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

Nanowebs can also be produced for the invention by the process of centrifugal spinning. Centrifugal spinning is a fiber forming process comprising the steps of supplying a spinning solution having at least one polymer dissolved in at least one solvent to a rotary sprayer having a rotating conical nozzle, the nozzle having a concave inner surface and a forward surface discharge edge; issuing the spinning solution from the rotary sprayer along the concave inner surface so as to distribute said spinning solution toward the forward surface of the discharge edge of the nozzle; and forming separate fibrous streams from the spinning solution while the solvent vaporizes to produce polymeric fibers in the presence or absence of an electrical field. A shaping fluid can flow around the nozzle to direct the spinning solution away from the rotary sprayer. The fibers can be collected onto a collector to form a fibrous web.

Nanowebs can be further produced for the medium employed in the method of the invention by melt processes such as melt blowing. For example, nanofibers can include fibers made from a polymer melt. Methods for producing nanofibers from polymer melts are described for example in U.S. Pat. No. 6,520,425; U.S. Pat. No. 6,695,992; and U.S. Pat. No. 6,382,526 to the University of Akron, U.S. Pat. No. 6,183,670; U.S. Pat. No. 6,315,806; and U.S. Pat. No. 4,536,361 to Torobin et al., and U.S. publication number 2006/0084340.

A substrate or scrim can be arranged on the collector to collect and combine the nanofiber web spun on the substrate, so that the combined fiber web is used as a high-performance filter, wiper and so on. Examples of the substrate may include various nonwoven cloths, such as meltblown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers, and mixtures thereof. Preferred materials that fall within these generic classes include, poly(vinylchloride), polymethylmethacrylate (and other acrylic resins), polystyrene, and copolymers thereof (including ABA type block copolymers), poly(vinylidene fluoride), poly (vinylidene chloride), polyvinylalcohol in various degrees of hydrolysis (87% to 99.5%) in crosslinked and non-crosslinked forms. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6, 6, nylon 6, 6-6, 10, and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly(ethylene terephthalate) and polyamides, such as the nylon polymers listed above.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The Handbook of Plasticizers, edited by George Wypych, 2004 Chemtec Publishing, incorporated herein by reference, discloses other polymer/plasticizer combinations which can be used in the present invention.

EXAMPLES

Fine Particle Flat Sheet Loading Test

ASHRAE dust and ISO fine dust are typically used as test aerosol in dust holding capacity test for filters as well as filter media. However the size of these two types of dust (greater than 15 micron mass average particle diameter) are not reflective of the size of dust which high efficiency air filters are challenged with in field applications, especially when pre-filters are used to remove large particles. Our field measurement in an air handling system with pre-filters indicates that particles larger than 3 microns are rare and between 0.3 to 10 microns size range, about 60% particle by mass falls between 0.3 to 0.5 micron size range. Therefore existing dust holding test using ASHRAE and ISO fine test aerosol does not accurately predict filter media dust holding capacity in real life situation. To overcome this problem, a fine particle dust-loading test was developed which uses test aerosol with a mass mean diameter of 0.26 micron.

Fine particle dust-loading tests were conducted here on flat-sheet media using automated filter test (TSI Model No. 8130) with a circular opening of 11.3 cm diameter (area=100 cm$^2$). A 2 wt % sodium chloride aqueous solution was used to generate fine aerosol with a mass mean diameter of 0.26 micron, which was used in the loading test. The air flow rate was 40 liter/min which corresponded to a face velocity of 6.67 cm/s. According to equipment manufacturer, the aerosol concentration was about 16 mg/m$^3$. Filtration efficiency and initial pressure drop are measured at the beginning of the test and the final pressure drop is measured at the end of the test. Pressure drop increase is calculated by subtracting the initial pressure drop from the final pressure drop.

Fiber Size Measurement

Ten scanning electron microscope (SEM) images at 5,000× magnification were taken of each nanofiber layer sample. The diameter of eleven (11) clearly distinguishable nanofibers were measured from the photographs and recorded. Defects were not included (i.e., lumps of nanofibers, polymer drops, intersections of nanofibers). The average fiber diameter for each sample was calculated.

For meltblown layer samples, five SEM images were taken. The diameter of at least 10 meltblown fibers was measured from each photograph and recorded. The average fiber diameter for each sample was calculated.

Air Permeability

Filtration media air flow permeability is commonly measured using the Frazier measurement (ASTM D737). In this measurement, a pressure difference of 124.5 N/m2 (0.5 inches of water column) is applied to a suitably clamped media sample and the resultant air flow rate is measured as Frazier permeability or more simply as "Frazier". Herein, Frazier permeability is reported in units of ft3/min/ft2. High Frazier corresponds to high air flow permeability and low Frazier corresponds to low air flow permeability.

Humidity Test

The objective of the humidity test is to study the effect of relative humidity on filtration media loaded with dust or aerosol. Flat sheet media samples were loaded with fine aerosol of NaCl (as described above) to a final resistance between 150 to 300 Pa. The samples were conditioned at 25° C. at different relative humidity for at least 8 hours. Air permeability of the sample was measured and recorded immediately after samples were removed from the conditioning chamber.

Filtration Efficiency Measurement

The filtration efficiency measurement was conducted on flat-sheet media using automated filter test (TSI Model No. 3160) with a circular opening of 11.3 cm diameter (area=100 cm2). A 2 wt % sodium chloride aqueous solution was used to generate fine aerosol with a mass mean diameter of 0.26 micron. The air flow rate was 32 liter/min which corresponded to a face velocity of 5.53 cm/s. Filtration efficiency and initial pressure drop were measured and recorded at the beginning of the test.

Mean Flow Pore Measurement

Mean Flow Pore (MFP) size was measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 μm to 300 μm by using automated bubble point method from ASTM Designation F 316 using a capillary flow porosimeter (model number CFP-34RTF8A-3-6-L4, Porous Materials, Inc. (PMI), Ithaca, N.Y.). Individual samples (8, 20 or 30 mm diameter) were wetted with low surface tension fluid (1,1,2,3,3,3-hexafluoropropene, or "Galwick," having a surface tension of 16 dyne/cm). Each sample was placed in a holder, and a differential pressure of air was applied and the fluid removed from the sample. The differential pressure at which wet flow is equal to one-half the dry flow (flow without wetting solvent) is used to calculate the mean flow pore size using supplied software. Bubble Point refers to the largest pore size.

Moisture Test Procedure

The moistures tester is an apparatus that contains an air chamber used to test the effects of water to simulate rain drops or water mist on filtration media. A sample of media is secured to the front, outside plane of the air chamber. Then, airflow is generated around the water nozzles and towards the media within the air chamber. Pressure differential between inside and outside of the air chamber is measured with pressure gauges. This value is recorded and the water nozzles are turned on. The water is left on for six minutes and pressure differential are taken at suitable intervals until the media is dry.

To run the test, an 18 cm by 18 cm sample of media is prepared. The sample is secured and sealed to outside of the air chamber perpendicular to the nozzle water stream using clamps. Air flow rate was 63 liter/min which corresponded to a face velocity of 6.67 cm/sec, the same face velocity specified by the ASHRAE 52.2 test protocol and an initial pressure measurement is taken.

Water is turned on for six minutes and fine water mists are generated by 3 water spray nozzles. The media is exposed to the water mists. The water flow rate was set at 70 ml/min. Every thirty seconds a pressure measurement is recorded until media dries out or pressure remains constant.

Web Preparation

For the examples, a 24% solution of polyamide-6, 6 in formic acid was spun by electroblowing as described in WO 03/080905 to form nanowebs. The number average fiber diameters were approximately 350 nm.

For examples 1 and 2, spunbond nonwoven webs were obtained made of polypropylene (68 grams per square meter (gsm) basis weight. Xavan® made by DuPont) and polyethylene terephthalate (PET) (70 gsm basis weight, F5070 style made by Kolon Co. in Korea) respectively. Melt blown webs were 23 gsm fine fiber webs made by DelStar Co. located in Middletown, Del. Spunbond plus meltblown plus nanofiber (i.e. SMN) laminates were constructed by laminating to a 30 gsm spunbond polyethylene terephthalate (PET) scrim., C3030 style made by Kolon Co. in Korea.

Example 3 was an MSN structure in which the M (a 20 gsm melt blown web made by DelStar Co. located in Middletown, Del.) and the S (a 70 gsm spunbond PET web, F5070 style made by Kolon Co. in Korea) or example 2 were reversed. Table 3 shows the pressure buildup comparison between examples 2 and 3.

Results

Table 1 shows the pressure drop and filtration efficiency measurements made by TSI 3160 for examples 1-3. Tables 2 and 3 show the pressure buildup behavior in the moisture test.

TABLE 1

| Example | Initial Efficiency (%) | Initial Pressure (mm water) |
| --- | --- | --- |
| 1 | 65.9 | 1.0 |
| 2 | 68.1 | 1.1 |
| 3 | 68.1 | 1.1 |

TABLE 2

Pressure Buildup After Exposure to Water Mist

| Time (seconds) | Example 1 Pressure (mm water) | Example 2 Pressure (mm water) |
| --- | --- | --- |
| 0 | 4.6 | 4.6 |
| 30 | 5.1 | Not recorded due to speed of pressure rise. |
| 60 | 5.6 | 152.4 |
| 90 | 5.6 | 177.8 |
| 120 | 5.1 | 165.1 |
| 150 | 5.1 | 165.1 |
| 180 | 5.1 | 165.1 |
| 210 | 5.1 | 177.8 |

TABLE 3

Pressure Buildup After Exposure to Water Mist.

| Time (seconds) | Example 3 Pressure (mm water) | Example 2 Pressure (mm water) |
| --- | --- | --- |
| 0 | 5.1 | 4.6 |
| 30 | 5.1 | Not recorded due to speed of pressure rise. |
| 60 | 5.1 | 152.4 |
| 90 | 6.35 | 177.8 |
| 120 | 7.6 | 165.1 |
| 150 | 10.2 | 165.1 |
| 180 | 15.2 | 165.1 |
| 210 | 15.7 | 177.8 |

In the above examples, numbers 1 and 3 had a hydrophobic web facing the air stream, in one case a spunbond and in one case a melt blown web. The data show the effectiveness of the invention in preventing pressure buildup by moisture. Although the melt blown web in the example 2 is hydrophobic and is upstream of nanoweb layer, the pressure increased is significantly high due to the hydrophilic spunbond nonwoven facing the air stream. Although the spunbond nonwoven is hydrophilic in the example 3 and is directly upstream of nanoweb layer and the pressure increased is significantly lessened due to hydrophobic melt blown nonwoven facing the air stream.

We claim:

1. A method for filtering particles from air laden with water mist comprising the steps of;
providing a flow of air laden with a water mist and containing particles that are to be filtered,
passing the air flow containing particles and laden with water mist through a filtration medium,
said medium having an upstream side and a downstream side relative to the flow of air and comprising a hydrophobic nonwoven web and a nanoweb layer, wherein the nanoweb layer has a basis weight of at least 2 grams per m$^2$ and is positioned downstream of and in fluid contact with the hydrophobic nonwoven web, and the hydrophobic nonwoven web is positioned so that it faces the air flow; and wherein the filtration medium when exposed to the air flow laden with water mist has a pressure drop measured across the medium which rises by a factor of no more than 10 after exposure to the air flow for 3 minutes.

2. The method of claim 1 in which a second web is placed in between the nanoweb and the hydrophobic web and is in fluid contact with both.

3. The method of claim 1 in which the hydrophobic web is in actual contact with the nanoweb.

4. The method of claim 3 in which the hydrophobic web is bonded over at least a portion of its surface with the nanoweb.

5. The method of claim 4 in which the hydrophobic web is point bonded to the nanoweb.

6. The method of claim 1 in which the hydrophobic web comprises a spunbond nonwoven web upstream of and in fluid contact with the nanoweb.

7. The method of claim 6 in which the spunbond nonwoven web is in actual contact with the nanoweb.

8. The method of claim 7 in which the spunbond nonwoven web is bonded to the nanoweb.

9. The method of claim 7 in which the spunbond nonwoven web is point bonded to the nanoweb.

10. The method of claim 6 in which the spunbond web comprises monocomponent or bicomponent fibers in which one component comprises a polyolefin.

11. The method of claim 1 in which the nonwoven web comprises a melt blown nonwoven web upstream of and in fluid contact with the nanoweb.

12. The method of claim 11 in which the melt blown nonwoven web is in actual contact with the nanoweb.

13. The method of claim 12 in which the melt blown nonwoven web is bonded to the nanoweb.

14. The method of claim 12 in which the melt blown nonwoven web is point bonded to the nanoweb.

15. The method of claim 1 wherein the ratio of mean flow pore size of the hydrophobic nonwoven web to that of the nanoweb layer is between about 1 to about 10.

\* \* \* \* \*